United States Patent
Purohit et al.

(10) Patent No.: US 8,521,606 B2
(45) Date of Patent: Aug. 27, 2013

(54) SYSTEM AND METHOD OF DETERMINING PRICE OPTIMIZATION FOR DISTRIBUTED DEMAND

(75) Inventors: Amarnath Purohit, Rochester, NY (US); Marc Cote, Pittsford, NY (US); Lewis S. Snow, La Crescenta, CA (US)

(73) Assignee: Xerox Corporation, Norwalk, CT (US)

( * ) Notice: Subject to any disclaimer, the term of this patent is extended or adjusted under 35 U.S.C. 154(b) by 207 days.

(21) Appl. No.: 12/969,895

(22) Filed: Dec. 16, 2010

(65) Prior Publication Data

US 2012/0158533 A1 Jun. 21, 2012

(51) Int. Cl.
*G06Q 30/00* (2012.01)

(52) U.S. Cl.
USPC ....... 705/26.1; 705/26.2; 705/26.3; 705/7.22; 705/7.26; 705/7.37; 705/10; 705/11; 705/28; 705/29; 358/1.14; 358/1.15; 358/1.16

(58) Field of Classification Search
USPC ............... 705/26.1, 26.2, 26.3, 10, 11, 28, 705/29, 7.22, 7.37; 358/1.14, 1.15, 1.16
See application file for complete search history.

(56) References Cited

U.S. PATENT DOCUMENTS

| | | | |
|---|---|---|---|
| 6,405,178 B1 * | 6/2002 | Manchala et al. | 705/29 |
| 6,573,910 B1 * | 6/2003 | Duke et al. | 715/740 |
| 7,912,748 B1 * | 3/2011 | Rosenberg et al. | 705/7.35 |
| 8,144,364 B2 * | 3/2012 | Rai | 358/1.9 |
| 2002/0019786 A1 * | 2/2002 | Gonzalez et al. | 705/28 |
| 2003/0041765 A1 | 3/2003 | Hill | |
| 2004/0008366 A1 * | 1/2004 | Ferlitsch | 358/1.15 |
| 2006/0178917 A1 * | 8/2006 | Merriam et al. | 705/7 |
| 2006/0230405 A1 * | 10/2006 | Fraenkel et al. | 718/104 |
| 2007/0177191 A1 * | 8/2007 | Eschbach et al. | 358/1.15 |
| 2007/0247659 A1 * | 10/2007 | Zhang et al. | 358/1.15 |
| 2009/0063251 A1 * | 3/2009 | Rangarajan et al. | 705/10 |
| 2009/0281878 A1 * | 11/2009 | Rane et al. | 705/11 |
| 2010/0268572 A1 * | 10/2010 | Handley et al. | 705/10 |

* cited by examiner

*Primary Examiner* — Yogesh C Garg

(74) *Attorney, Agent, or Firm* — Fay Sharpe LLP

(57) ABSTRACT

The method for reducing vendor bid amounts includes providing a supplier with an invitation to make a bid for supplying a digital print job. The print job is characterized by a demand for a first number of units by a select date. The method further includes determining if a demand condition can be met. The determination includes using historical data to calculate a first commitment quantity for current jobs being provided by the supplier. The first commitment quantity is then used to calculate a second commitment quantity. The second commitment quantity provides an estimate for the number of the units and a date. The second commitment quantity is displayed to the supplier. The method provides the supplier with an option to bid for producing the estimated number of units by the estimated date.

13 Claims, 4 Drawing Sheets

| HOME | NEW JOBS | JOB STATUS | TEMPLATES | VENDORS |

JOB PRICE    Commercial Print Job: Heavy_Stock
Step: Pricing Detail

Description

| | | | |
|---|---|---|---|
| Job Id | 34261 | Bid Due Date | 20 Mar 2013 04:00 PM |
| Name | Heavy_Stock | Delivery Due Date | 17 Oct 2013 04:00 PM |
| Category | Comm Print | Artwork Due Date | |
| Subcategory | Comm Print | Special Instructions | |
| Job Description | ascf | Samples Requested | |
| Customer Name | Client01 | Ship to | |
| Customer Department | | Supplier | Canada Supplier |
| Budget Line/Cost Center | | | |
| Internal Buyer Use Only | | | |
| Project Name | | | |
| Project ID | | | |

Quantity 100000

Print Vendor Model:

| | |
|---|---|
| Press Type | Large Sheetfed |
| Mean Demand | 100000 |
| Standard deviation of demand | 20000 |
| Price | $89.00 |
| Cost | $84.00 |
| Salvage value | $67.00 |

Results

Commitment Quantity (Q) : 85042.83
Expected sales : 82409.77
Fill rate : 82.40%
Expected profit : $367286.90

FIG. 4

SYSTEM AND METHOD OF DETERMINING PRICE OPTIMIZATION FOR DISTRIBUTED DEMAND

BACKGROUND

The present disclosure is directed toward a reverse auction program and, more specifically, to a program that provides print job vendors with computed costs and returns for basing bid amounts.

Customers solicit vendors to render print output according to certain print job specifications. For smaller jobs, a customer may approach a select vendor (or supplier) with the particular specifications. However, multiple vendors may approach the customer to compete for rendering more complex or higher quantity jobs. A "reverse auction model" is a platform for soliciting bids from multiple vendors. A program adapted to perform the reverse approach is described in U.S. Application 2009/0281878, filed May 7, 2008. The reverse auction model creates a more competitive environment for vendors. Multiple vendors receive the job specifications and can submit bids dynamically through a network. However, the reverse auction model is discretionary as it invites only a select group of vendors to bid on a given print job. The application computes a preview price for selecting the group. The preview price is a qualifier based on a contractual rate (i.e., a vendor-supplied source rate), submitted in advance, and vendor capability, based on customer-entered data. More specifically, the program selects the group of vendors capable of rendering the print job on select press types specified by the customer.

The reverse auction model generally determines which vendors are able to provide the customer's print needs. The program assists vendors with submitting bids at appropriate rates by allowing the vendors to analyze the prices associated with the job specification beforehand.

One aspect of the reverse auction model is that it relieves customers of tasks associated with negotiating a contractual work agreement with a vendor. A document advisor is charged with the task of providing the customer's needs at a lowest possible cost. Accordingly, the reverse approach model or program aids the document advisor in narrowing the group of vendors for soliciting bids. One disadvantage associated with the program, however, includes a risk incurred by the vendors; there may be a reduced enterprise-wide awareness of vendors' expenditure on rendering the print job when a host of different (e.g., international) vendors are contracted. There is a risk that some vendors may not be cost competitive, and other vendors may fail to meet the demand.

While the document advisor utilizes the program for obtaining a lowest possible bid for the customer, there exists a need for the program to calculate a lowest bid amount that also maximizes a highest profitable return for the vendor. More specifically, a program is needed that benefits both the customer and the vendor.

INCORPORATION BY REFERENCE

This application is related to co-pending, commonly assigned U.S. patent application Ser. No. 12/116,316, filed May 7, 2008, entitled "Digital Print Procurement Using Reverse Auction", and naming Harsha, et al. as inventors, and is incorporated herein by this reference in its entirety.

BRIEF DESCRIPTION

A first embodiment of the disclosure is directed toward a method for reducing supplier bid amounts. The method includes providing a supplier with an invitation to make a bid for supplying a digital print job. The print job is characterized by a demand for a first number of units by a select date. The method further includes determining if a demand condition can be met. The determination includes using historical data to calculate a first commitment quantity for current jobs being provided by the supplier. The first commitment quantity is then used to calculate a second commitment quantity. The second commitment quantity provides an estimate for the number of the units and a date. The second commitment quantity is displayed to the supplier. The method provides the supplier with an option to bid for producing the estimated number of units by the estimated date.

A second embodiment of the disclosure is also directed toward a method. The method includes offering a digital print job to a printing entity that meets predetermined criteria. The method further includes providing the entity with an estimated commitment quantity for the print job. The estimated commitment quantity is based on historical production data of the entity, a second commitment quantity of current jobs of the entity, time and quantity parameters, and selective entity-entered data. The method continues with providing the entity with an estimated profit based on the estimated commitment quantity. The entity is then offered an invitation to bid for the print job. The method is performed using a web-based application.

A third embodiment of the disclosure is directed toward a web-based program for providing and accepting bids for a print job. The program includes a computer-usable data carrier for storing instructions that are executable by a computer. The data carrier is adapted to provide a supplier with an invitation to bid for a digital print job. The carrier is further adapted to use historical data of the supplier to calculate a first commitment quantity for current jobs being provided by the supplier. This first commitment quantity is used to calculate a second commitment quantity for estimating a number of units that the supplier can provide by an estimated date. The carrier is further adapted to calculate an estimated profit for the supplier. The program provides the supplier with an option to bid on producing the digital print jobs.

DETAILED DESCRIPTION

Figure 1:
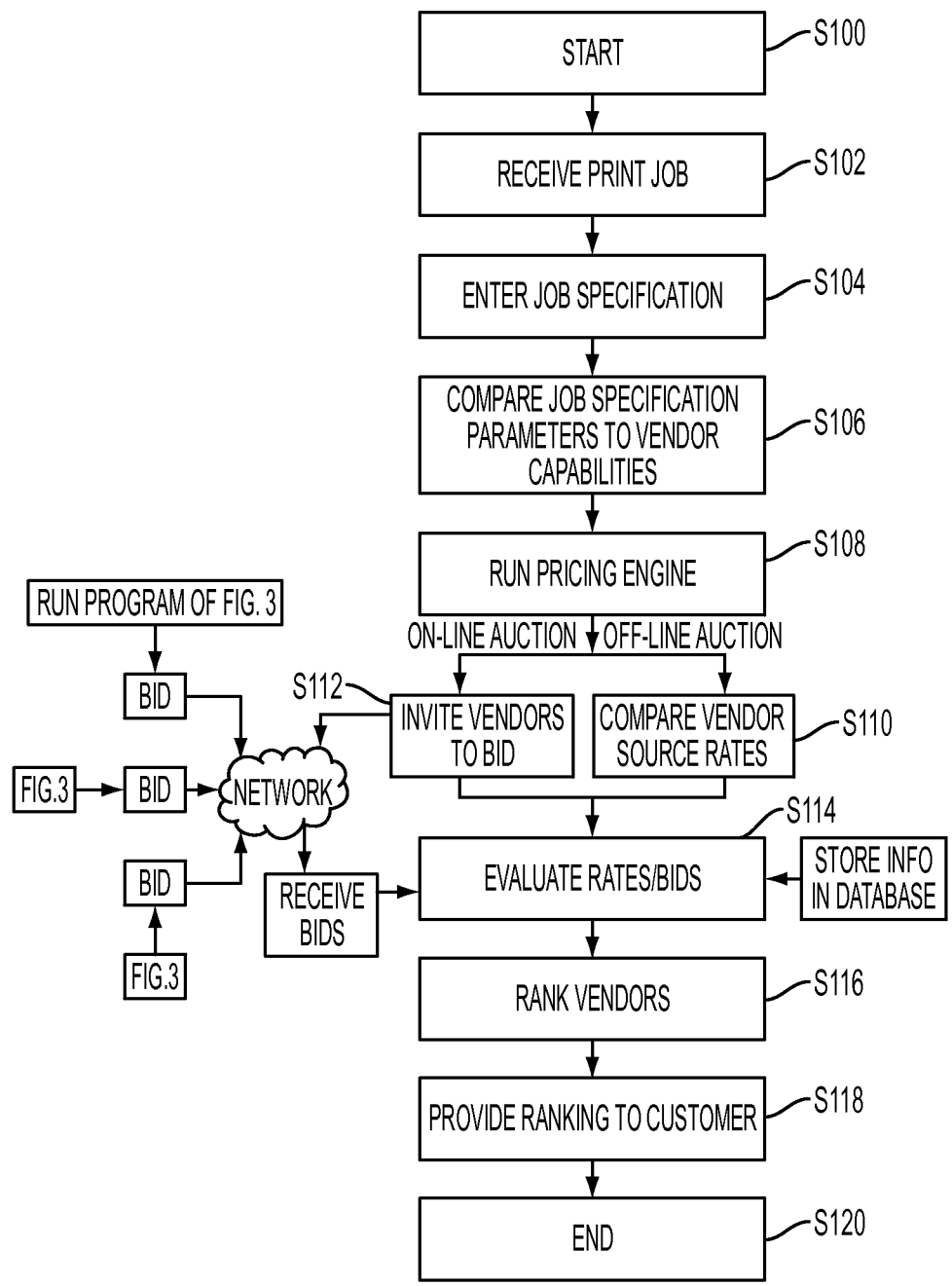
FIG. 1 is flowchart generally describing a reverse auction process.

The present disclosure is directed toward a feature of a reverse auction model. The reverse auction model (hereinafter synonymously referred to as "program") is a web-based procurement application. In one reverse auction model, described in U.S. 2009/0281878, vendor capabilities are collected up front for computing preview prices. The contents of the '878 application are incorporated herein in their entirety. The program qualifies vendors for bidding if their production equipment is capable of rendering specified print jobs under certain print quantity (and/or volume) and time constraints. A flow-chart of FIG. 1 summarizes the reverse auction process.

The reverse auction process starts at S100. A customer and a document advisor have a sourcing engagement. The document advisor is entrusted to complete print jobs for the customer. The document advisor and customer establish a relationship in which the document advisor purchases prints on behalf of the customer. The document advisor receives a print job from the customer at S102. Generally, the customer indicates a maximum amount that it is willing to spend on the print job to the document advisor. The print job may include particular instructions regarding, for example, select presstypes for rendering the output, and media types for carrying the output, etc. The document advisor creates and enters the job specification in the reverse auction program at S104. The program generates a list of vendors situated within a select region that can actually bid on the job. More particularly, the program compares parameters set forth in the job specification to vendors' capabilities at S106. More specifically, the program disqualifies from contention any vendor that does not meet the parameters. As an example, the customer may have entered a particular presstype for rendering the output or a particular output type that can only be rendered on certain presstypes. Accordingly, vendors are disqualified if they are incapable of rendering the print job due to an absence of the presstype in their print shop. In the next stage of the process, the program runs a pricing engine at S108 for vendors that are identified as being capable of producing the print job. In an off-line auction, the previously vendor-supplied source rates are compared against one another at S110. The program generally receives a predicted price based on stored source rate data. In an on-line auction, the program invites qualifying vendors to place bids through a network at S112. The program sends the print job specification to the vendors for bids. The vendors optionally log-in to the program to bid on the print job. The rates and/or bids are evaluated (S114) against the vendor profile to assess if the specific vendor is capable of producing the print job. The vendor profile includes information collected from each vendor and is stored in a database, such as, for example, print volume constraints, limitations related to media stock, and finishing service capabilities, etc. The program ranks the vendors at S116, and this ranking is provided to the customer at S118. The program ends at S120.

The improvement disclosed herein includes programmed actions that are performed for the vendor after the vendor receives an invitation to bid at S112 but before the vendor submits a bid at S114. Generally, the program validates that a profit may be maximized for the vendor if it bids at a certain amount. The vendor may bid with confidence that the print job, if awarded, may be satisfied under agreed terms and that it may earn a profit. The program takes a concept of the Newsvendor Model and modifies it to retrofit the needs of a vendor. The Newsvendor Model is a model for optimizing operation management.

In the program, a print job request is received for a specific quantity Q. While the known program utilizes stored (profile) information to determine if the vendor's print shop includes resources and equipment for producing the print job, the present program determines whether the vendor may render the print job to completion within a required time frame. Furthermore, the program provides the vendor with cost information, based on vendor-entered or historical salvage values, and other data that enables determinations for a commitment quantity, a fill rate, and an estimated, expected profit. These values are used in calculating a suggested bid amount.

Figure 2:
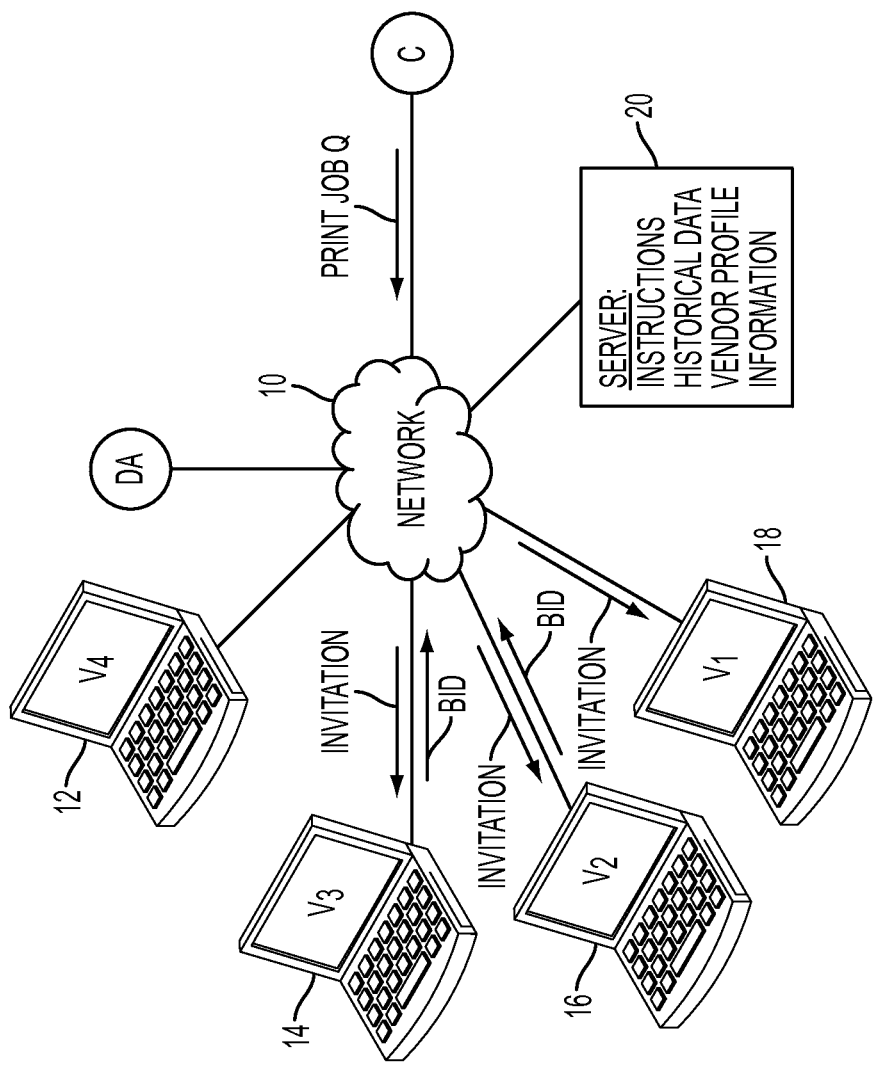
FIG. 2 illustrates connected entities utilizing a web-based auction program according to an embodiment of the disclosure.

Referring to FIG. 2, a diagram illustrates a relationship between entities utilizing the auction program. As mentioned, the customer C and document advisor DA have a sourcing engagement. In the present disclosure, the multiple vendor(s) V1-V4 and the document advisor DA may also have a sourcing engagement. The document advisor DA and each vendor V1-V4 establish a relationship in which the document advisor DA considers the vendor V1-V4 as a provider of prints purchased on behalf of the customer C. Because the document advisor DA receives a print job from a customer C, the document advisor DA generally manages the list of qualifying vendors V1-V4 capable of providing the print job. Accordingly, the sourcing engagement may give select vendors (e.g., V1-V3) an opportunity to be the provider of goods/services.

The document advisor DA and the selected vendors V1-V4 are connected to a network 10. The auction program is a web-based program that is performed dynamically through the network 10. Each entity of the relationship may utilize a computerized device to access and run the program, including communications to other entities. A computerized device may be a PC, such as a desktop, a laptop, palmtop computer, portable digital assistant (PDA), server computer, cellular telephone, pager, or other computing device capable of executing instructions for performing the exemplary auction program. In one embodiment, the entity may include such a device at its facility. Various computerized devices 12-18, such as servers and workstations, may be used to execute the instructions of the program.

A software program is stored on an electronic memory (i.e., a computer usable data carrier) for implementing the program when a relationship is established between a document advisor DA and a vendor V. The term "software" as used herein is intended to encompass any collection or set of instructions executable by the computer 12-18 or other digital system so as to configure the computer 12-18 or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server 20 or so forth, source code, interpretive code, object code, directly executable code, and so forth. It is contemplated that the software may invoke system-level code or calls to other software residing on the server 20 or other location to perform certain functions.

The method disclosed herein may be implemented in a computer program product that may be executed on the (vendor's) computer 12-14. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

As referred to herein, a vendor is any supplier that produces, manufactures, and/or supplies (units of) goods or services for a job commissioned with certain terms or specifications. A vendor is a printer or printing entity in an exemplary embodiment of the disclosure. A job of the exemplary embodiment includes a digital or an offset printing job. However, there is no limitation made herein with respect to the particular type of job commissioned and/or good or service provided. Any customer job may be commissioned using other types of manufacturing or service facilities. The unit produced by the vendor is not limiting as the present auction method is adapted for incorporation in a wide range of customer-vendor relationships and sourcing engagements.

Vendors that do not have the resources to execute the print job are eliminated as possible bid contenders before invitations are sent. Each one vendor may be determined as meeting or failing particular qualifying criteria before the invitations to bid (see S112 of FIG. 1) are communicated to select vendors through the network. For example, the print job may specify a particular presstype of which the output is rendered. Each vendor includes (e.g. digital print) production capabilities that are stored in a memory or a database at the server. The capabilities may be based on, for example, the type of press or similar preprocessing and (finishing or) post-processing equipment included in the vendor's facility. Known capabilities are evaluated for the vendors to determine which entities are capable of producing the job. Generally, the program determines which vendors are capable of fulfilling the print job by matching the print job requirements to the device characteristics entered in each vendor's (Equipment) profile. The program may generate a preference list based on the profile. An invitation list may be generated for only the vendors that possess (an access to) the equipment necessary for producing the job.

Another example of a qualifying criterion may alternatively include a region of which a production facility is desirably located. The customer may desire to transport goods by a particular method (e.g., barge, air, rail) for environmental, economic, or energy purposes. There is no limitation made herein to qualifying criteria. Namely, the criteria are set forth as part of the job terms. The qualifiers are determined using stored information previously collected for vendors. The preference/invitation list may be generated for the vendors that satisfy the terms using collected profile and historical data.

A ranking of the vendors on the preference list may further be based on price criterion. As discussed for the source rates of S110 in FIG. 1, each vendor may (previously) enter a source rate in its profile. The program may output a list of capable vendors in order of lowest preview price to highest preview price. The program specifies the vendors from the list as an application index of vendors from least expensive to most expensive.

Figure 3:
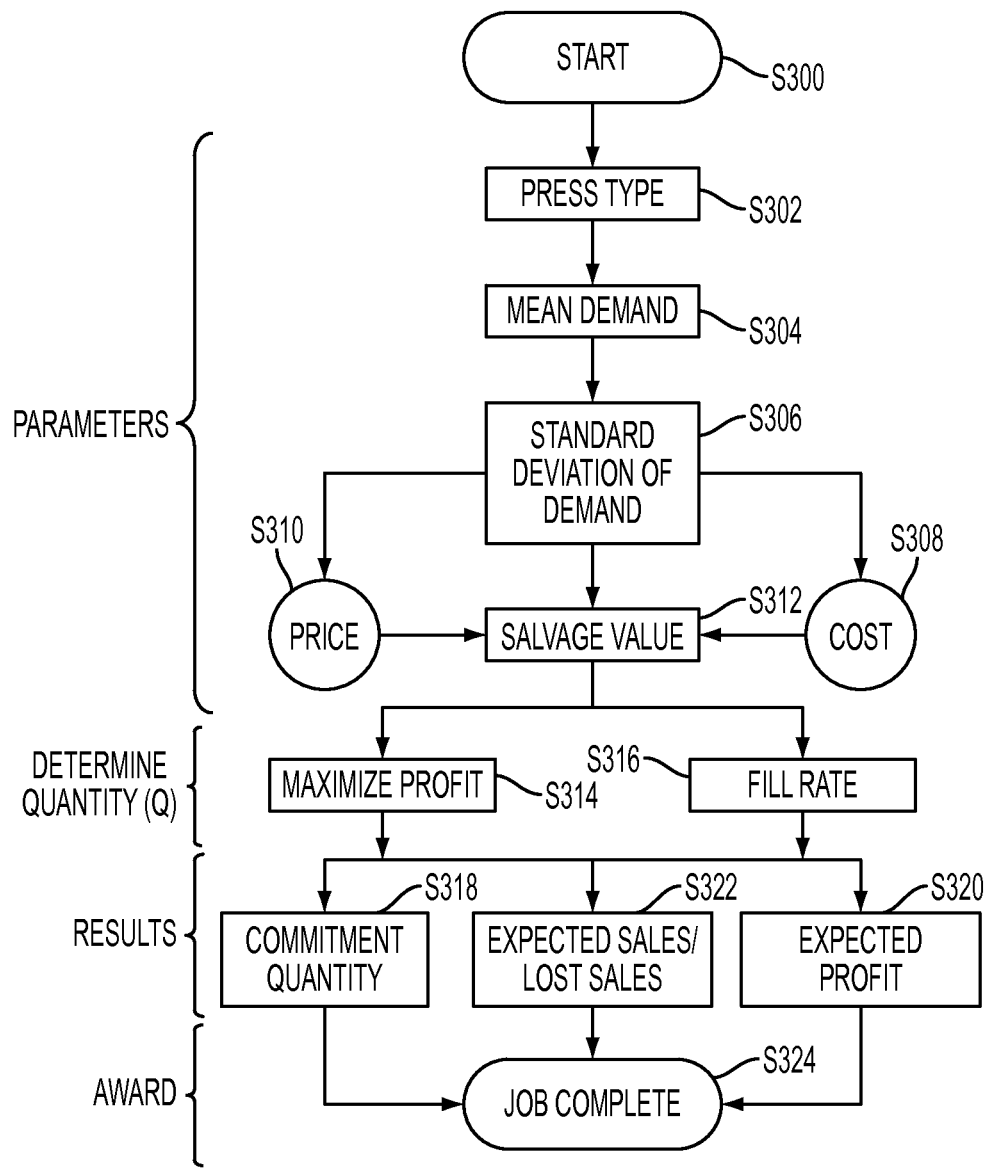
FIG. 3 is a flow-chart describing the program according to an exemplary embodiment of the disclosure; and, FIG. 4 is a program display according to the present disclosure.

FIG. 3 illustrates a flowchart describing the presently disclosed process for communicating and evaluating print jobs to a vendor. The presently disclosed program starts at S300 with the invitation to bid that is communicated through the network to qualifying (i.e., capable) vendors. The invitation includes at least information about the print job, including terms. The job may be characterized by a demand for a quantity Q of output and a select (target or deadline) date for producing (a portion of or all of) the output. The program communicates the terms of the print job to the vendor in the provided invitation. The invitation may be communicated, for example, by email message through a privately accessed account. An interested vendor, in receipt of the private communication, may accept the invitation and submit a bid after optionally executing the program and considering the results. Accordingly, an interested vendor logs into the program to execute it with respect to that vendor's personalized data and parameters. The program of the present disclosure may be executed at the vendor's computer. Alternatively, input variables may be communicated from the vendor's computer to the server, where the program is executed, and results may be communicated back to the vendor's computer from the server.

In one embodiment, the vendor may review the terms and selectively execute the present program. In another embodiment, the program may execute automatically when preceding actions of the reverse auction program selects the vendor as a qualifying entity. Generally, an interested vendor may execute the program to analyze if the print job can be optimized from the print shop point-of-view based on a configuration of the print shop. The program determines, and displays to the vendor, information describing how the vendor may obtain savings from the (awarded) print job and an expected profit if such job is awarded.

With continued reference to FIG. 3, a factor that may be considered in the computation of the results is the presstype. The vendor may input selected presstypes at S302, e.g., half-web or full-web presses, large sheet feed presses, etc., for generating the pricing detail. The vendor may input a presstype that it may utilize in its facility based on particular requirements of the job description. Alternatively, the vendor may input available presstypes that it may utilize for providing the print job because other unavailable presstypes are being used for nonrelated jobs and/or matters. The vendor-selected presstypes may alter the fill-rate and, hence, an estimated profit to the vendor.

With continued reference to FIG. 3, the program calculates a current commitment quantity at S304. The current commitment quantity is more generally referred to as a mean demand for other jobs within the vendor's facility. The current commitment quantity may include all active jobs that the vendor is commissioned to produce. In another embodiment, the current commitment quantity may be limited to only the active jobs that the vendor would concurrently produce with the present print job. In other words, the current commitment quantity considers all services and/or output that the vendor has agreed to produce on or about the same period as the discussed print job. Accordingly, these other jobs may compete with the resources available at the vendor's facility. These same resources may be included in the vendor's profile, thus initially making the vendor a qualifying entity for the print job. However, the vendor's profile may not include information directed toward an availability of the resources with respect to other (competing) jobs. Therefore, the current commitment quantity is computed. The computation may be based on vendor-input data or it may be obtained from stored data.

The current commitment quantity may include a total quantity of all jobs in existence at the facility. Alternatively, the current commitment quantity may include a total mean for all the jobs in existence. The current commitment quantity may more particularly refer to the total number of units (e.g., copies, documents, etc.) for a collective sum of jobs that the vendor is committed to produce, whether production has been instituted or not. Alternatively, the current commitment quantity may refer to a collective sum of (units for) jobs that the vendor is committed to produce within the same time frame and/or under similar limitations (e.g. utilizing same resources) as the discussed print job. The mean may include an average number of units that the vendor is committed to produce for the current jobs. For example, the mean may include the average number of output units that the vendor may be required to produce per day (or a similar time unit).

With continued reference to FIG. 3, another parameter that may be considered in the computation is a standard deviation of demand, which is calculated at S306. The standard deviation refers to a difference between a number of units produced per select time unit, s.a., a day, and an ideal production rate. More particularly in one example, the differences are averaged for a select number of days. In other words, if the ideal production rate is 100,000 units per day, but historical data indicates that the vendor's resources may have produced as few as 80,000 similar units at an earlier date or as much as 120,000 similar units at an earlier date, then the standard deviation may be calculated as 20,000 units per day. In one embodiment, the standard deviation value may be calculated as a difference between a previous production rate and the ideal production rate. For multiple considered dates, an average of the differences may be computed as the standard deviation value. Alternatively, the greatest of the difference values may be determined as the standard deviation value. The daily production rates may be provided to the program by historical data collected and stored in the memory. The standard deviation may be considered in calculating the later discussed results. More particularly, the standard deviation may be considered in determining whether the vendor is capable of producing the ordered quantity of the print job within the time constraints specified by the deadline. There is no limitation made to the time unit used in determining the standard deviation. In one embodiment, the time unit may include months or quarters.

With continued reference to FIG. 3, a further variable that may be considered in computing the results is a cost to the vendor. More particularly, the vendor may input an estimated cost parameter at S308. The cost may be referred to as the production/procurement costs, such as, for example, the costs of materials, the utilities, salaries to employees, overhead, and maintenance, etc. There is no limitation made herein to the factors that are considered as costs to the vendor. In alternative embodiments, the cost may be calculated as an estimated amount based on historical data stored in the memory. The historical data may include costs for similar jobs that were previously produced. Another embodiment of the program tracks and monitors print purchasing and costs based on the inventory at the vendor's facility. The tracked inventory data may be stored in a memory or a database of the server. The program may manage inventoried consumables such that there is, for example, a reduction in discarded units. One aspect of the inventory data is that it provides the vendor with an ability to competitively bid on a price structure.

With continued reference to FIG. 3, another input option may include a price value. The vendor and/or user may input into the program a price at S310 that such vendor may quote as a base bid amount. Generally, the program disclosed herein validates to the vendor whether or not the quoted price, if it were a contracted price, would generate a maximized profit.

With continued reference to FIG. 3 and in more specific detail, multiple parameters (or sourcing data) may be considered as variables in the computation for the estimated results. These parameters may be generated from historical data, or they may be vendor-provided data that is selectively input by the vendor. One exemplary variable that the vendor may input for consideration in the computation is a salvage value at S312. The salvage value is referred to as an amount (i.e., a cost) that the vendor may be willing to lose for discarded units. A discarded unit may include a unit that fails to meet a quality issue and is therefore not supplied to the customer. A discarded unit may also include the units produced in excess of the quantity ordered by the customer. The vendor may input this salvage value as a currency (e.g., dollar) amount. Alternatively, the vendor may input the salvage value as a number of units that may be discarded, wherein the program may compute the loss of profit for consideration in the results. Generally, the salvage value may be used to calculate an expected profit based on the amount that the vendor may charge per unit considering the cost that it will incur for discarded parts.

With continued reference to FIG. 3, at a conclusion of collecting and/or inputting the parameters based on the program-selected or user-selected inputs, an option may be provided to the vendor and/or user for inputting a demand condition as a basis for determining the results. A first option may include a selection for maximizing profit at S314. A second option may include a selection for a filling rate at S316. The program bases the computation results on the selection to achieve the aims of the vendor. For example, if the maximized profit option is selected by the vendor (or alternatively by default), the results will provide values that may produce a maximum profit, but may not be the least wasteful. If the fill-rate option is selected, the result values may provide for filling a quota of ordered output by the deadline date, but the vendor may not receive the highest gain.

If the fill rate option is selected, the program may output the number of units that the vendor may commit to (and/or expect to be capable of) producing by the select date based on the current demand for other jobs and the resources available to the vendor. The number of units may equal the commissioned quantity of the print job. The number of units may be less than or greater than the commissioned quantity of units. The program may use either the selected maximum profit methodology or the selected fill-rate methodology to generate the results. The program may outline to the vendor how a certain (suggested) bid amount will generate an expected profit and/or how the bid amount may be optimized based on a fill rate.

Accordingly, the program determines results, based on the selection, for displaying to the vendor. A first result, as mentioned, is a number of units that the vendor may commit to producing for the customer. This number of units for commitment purposes is referred to as an estimated commitment quantity. The estimated commitment quantity may be represented as a total number of units that the vendor may commit to rendering by the deadline date. It may alternatively refer to the number of units that the vendor may commit to producing per unit of time.

The input parameters may be used as a variable for calculating the estimated commitment quantity at S318 for the print job. The estimated commitment quantity may provide the vendor with an estimated number of the commissioned units (i.e., copies, documents) that the vendor is capable of producing by an estimated date. The estimated date may be the same as the select, i.e., deadline, date. The estimated date may alternatively include a date that precedes or antecedes the select date.

The estimated commitment quantity may also include, as a variable in its calculation, the quantity of units and/or time limitations requested for the present print job. In other words, the quantifiable terms of the job specification are used as variables in the calculation. An additional variable that may be considered in the computation is a previous production rate stored as historical data in the vendor's profile. The previous production rate may consider a previously accomplished fill-rate for a similar quantity, or it may include a production rate for using a similar set of resources.

It should be noted that not every parameter and/or variable may be required for calculating the estimated commitment quantity (or any result); rather, a calculation may be based on one input variable for outputting a desired output. In one embodiment, each or certain ones of input variables may be optional to the vendor. In another embodiment, the input variables may be required by the program. In further embodiments, variables requiring user-input may be optional while the program relies on variables drawn from historical data. In other embodiments, the program may rely only on the vendor-input parameters without historical data. There is no limitation made herein to the source of input data used in the computations.

Another result that the program may output includes an estimated or expected profit at S320. To maximize the profit, it may be desirable that the vendor produce a quantity of output that provides for no loss sales. Accordingly, the program may calculate a cost of underage and/or a cost of overage. The cost of underage is referred to as the cost of producing one more unit than what is ordered. The cost of underage is more particularly a difference between cost and the salvage value. The cost of overage is referred to as the cost of producing one unit fewer than what is ordered. The cost of overage is more particularly a difference between the price and the cost.

With continued reference, the program computes and/or displays the expected sales and/or lost sales at S322. The expected lost sales are referred to as an average number of units (demanded) that exceed the order quantity. The expected sales are referred to an average number of units sold.

After the inputs (sourcing data) are collected from the vendor as part of the sourcing engagement, as mentioned, the program will generate the price model and analysis based on the collected data. The results of the analysis are displayed to the vendor. FIG. 4 illustrates an example of results included on a display for illustration purposes. The information is privately displayed on the vendor's computer (monitor). As illustrated, details of the job description may be displayed for the vendor to view. Furthermore, select input parameters may be displayed. Exemplary parameters that may be used as variables for computing results may also be displayed. Exemplary parameters, such as press-type, may be displayed after they are user-input. Other parameters, such as the standard deviation, may be automatically calculated and displayed using stored historical data. The program may characterize its solution on the display. For example, the program may characterize a solution based on a user-selected quantity determination by evaluating at least one performance measure.

A performance measure may include expected lost sales, expected sales, expected leftover inventory, expected profit, expected commitment quantity, in-stock probability, or stockout probability. The expected leftover inventory is referred to as an average number of units that are leftover at an end of a season. Expected profit is referred to as the positive gain after expenses. The expected commitment quantity is referred to as the number of units that the vendor may commit to producing. The in-stock probability is referred to a probability that all demands are satisfied. The stockout probability is referred to as a probability that some demand is lost.

Based on the present program, the vendors may negotiate modifications to terms of the job specification, such as price reductions and/or increases. The negotiations may be provided as closed communications between the vendor and the customer. Generally, the vendor may be given an opportunity to fine-tune the job specifications to increase productivity or to determine alternate production methods that may decrease costs. As a result, the vendor may negotiate a better price with the customer and expect a lower margin on a volume of sales. For example, the results of the program may indicate to the vendor that it cannot produce a number n (e.g., 100,000) parts by the select deadline date. However, the results do indicate that the vendor is capable of producing number n-m (e.g. 85,000) parts by that date. The vendor may elect to negotiate an extension of the production term to a later date, if the customer is open to such negotiations. The lower margin may result in lowering the price of the bidding and making it more economically viable for the vendor to be awarded a contract for the print job. At a conclusion of the program, as mentioned, the vendor may rely on the displayed results to place a confident bid. If the bid is accepted because the results formulated the most competitive quote, then the auction model may result in the vendor being awarded the job. The program completes at S324.

Alternatively, the vendor may resubmit different variables to generally modify the results if the displayed results are not agreeable. For example, the vendor may resubmit as input alternative vendor-selected presstypes or salvage values. There is no limitation made herein to the number of times the program may be executed given each one invitation.

One aspect of the program is that the results provide the vendor with knowledge that aids in it placing a reduced bid price. The customer gains a benefit of awarding the print job at the lowest price and the vendor is better able to manage the operational process by minimizing the vendor's total expected cost. The program creates an unparalleled procurement solution that drives profitability and productivity at reduced costs to both entities of the sourcing engagement.

Although the program is illustrated and described above in the form of a series of inputs and outputs, it will be appreciated that the various computations and processes of the present disclosure are not limited by the illustrated ordering of such. In this regard, except as specifically provided hereinafter, some computations may occur in different order and/or concurrently with other computations apart from those illustrated and described herein in accordance with the disclosure. It is further noted that not all illustrated variables/parameters may be required to implement a process in accordance with the present disclosure, and one or more such variables/parameters may be combined. The illustrated program and other programs of the disclosure may be implemented in hardware, software, or combinations thereof, in order to provide the control functionality described herein, and may be employed in any system including, but not limited to, the above illustrated system of FIG. 2, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for suppliers for basing bid amounts, comprising:
  providing a supplier with an invitation to place a bid for supplying a digital print job characterized by a demand for a first number of units by a select date;
  determining, by a program being executed on a computer device, if a supplier-provided demand condition related to the supplying a digital print job can be met, including:
    using historical data to calculate a first commitment quantity for current jobs being provided by the supplier, and
    computing a second estimated commitment quantity including an estimated number of the units that the supplier is capable of producing by an estimated date;
  displaying the estimated commitment quantity to the supplier; and,
  providing the supplier with an option to bid for the print job.

2. The method of claim 1, wherein the calculating of the first commitment quantity includes calculating a mean demand for a total quantity of all the current jobs being provided by the supplier.

3. The method of claim 1, wherein the calculating of the estimated commitment quantity includes using a supplier-entered salvage value as a variable in a computation.

4. The method of claim 3, further including:
calculating an estimated profit based on the salvage value.

5. The method of claim 1, wherein the demand condition is a maximized profit.

6. The method of claim 1, wherein the demand condition is a fill-rate.

7. The method of claim 1, further including using input for an availability of additional resources as variables included in a calculation for the first commitment quantity.

8. The method of claim 1, wherein the providing of the invitation and the providing of the option are web-based communications made to the supplier.

9. The method of claim 1, wherein the providing of the invitation is based on a determination that the supplier passes initial qualifying criteria.

10. The method of claim 1, wherein the method for providing bids is included on a reverse auction program for providing a customer with a list of suppliers, the program identifies suppliers that pass initial qualifying criteria.

11. The method of claim 10, further including storing historical data related to a second number of units produced by the supplier within a select time frame.

12. The method of claim 1, further including evaluating bids based on the demand condition.

13. The method of claim 1, further including providing the supplier with an option to negotiate a modification of the demand condition based on the displayed second commitment quantity.

* * * * *